(12) United States Patent
Toor et al.

(10) Patent No.: US 8,204,372 B2
(45) Date of Patent: *Jun. 19, 2012

(54) MICRO CAMERA MODULE WITH DISCRETE MANUAL FOCAL POSITIONS

(75) Inventors: John W. Toor, Palo Alto, CA (US);
Elaine B. Bogue, Dunstable, MA (US);
Ellen B. Cargill, Norfolk, MA (US);
Kraig S. Clark, Erie, CO (US)

(73) Assignee: Flextronics AP LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/930,799

(22) Filed: Jan. 18, 2011

(65) Prior Publication Data

US 2011/0116779 A1 May 19, 2011

Related U.S. Application Data

(63) Continuation of application No. 12/317,295, filed on Dec. 22, 2008, now Pat. No. 7,873,269, which is a continuation of application No. 11/242,646, filed on Oct. 3, 2005, now Pat. No. 7,469,100.

(51) Int. Cl.
*G03B 13/34* (2006.01)
(52) U.S. Cl. ...................................... 396/144
(58) Field of Classification Search .............. 396/144, 396/147; 348/335, 340, 345, 374, 375
See application file for complete search history.

(56) References Cited

U.S. PATENT DOCUMENTS

| 3,393,622 | A | * | 7/1968 | Schottle et al. | 396/147 |
| 4,229,092 | A | * | 10/1980 | Iwata | 396/147 |
| 7,127,162 | B2 | * | 10/2006 | Mano | 396/144 |
| 7,422,382 | B2 | | 9/2008 | Sea | |
| 7,442,382 | B2 | * | 10/2008 | Henson et al. | 424/422 |

(Continued)

FOREIGN PATENT DOCUMENTS

EP 1 288 694 A1 * 3/2003

(Continued)

OTHER PUBLICATIONS

JP Application No. 2008-533403, Office Action dated Jul. 25, 2011.

(Continued)

*Primary Examiner* — W. B. Perkey
(74) *Attorney, Agent, or Firm* — Sheridan Ross P.C.

(57) ABSTRACT

A novel micro camera module that is manually adjustable between a close-up mode and an infinite mode includes a lens assembly adjustably mounted within a sleeve that is adjustably mounted into a housing. In a particular embodiment the sleeve includes a channel (cam groove) that is engaged by a plurality of pins fixed to the housing. Further, a biasing member is disposed between the sleeve and the housing such that an upward force will enable the pins to firmly engage the lower portion of the channel. In a more particular embodiment, the channel defines two detents that secure the sleeve into predetermined positions with respect to the housing. In an even more particular embodiment, the channel is sloped such that upon rotation of the sleeve, the distance between the lens assembly and an image capture device is changed. In another particular embodiment, the camera module includes an electrical mode detecting switch that is indicative of the position of the camera module.

51 Claims, 8 Drawing Sheets

U.S. PATENT DOCUMENTS

| | | | |
|---|---|---|---|
| 7,469,100 B2 * | 12/2008 | Toor et al. | 396/144 |
| 7,873,269 B2 * | 1/2011 | Toor et al. | 396/144 |
| 2005/0063695 A1 * | 3/2005 | Kameyama | 396/144 |
| 2005/0190283 A1 * | 9/2005 | Ish-Shalom et al. | 348/340 |
| 2006/0216014 A1 * | 9/2006 | Morinaga et al. | 396/144 |
| 2007/0009246 A1 * | 1/2007 | Lee | 396/72 |

FOREIGN PATENT DOCUMENTS

| | | |
|---|---|---|
| EP | 1288694 | 3/2003 |
| JP | 2003-337279 A | 11/2003 |
| TW | 236 573 B * | 7/2005 |
| TW | 236573 | 7/2005 |

OTHER PUBLICATIONS

International Search Report for International (PCT) Application No. PCT/US2006/035660, mailed May 22, 2007.

Written Opinion for International (PCT) Application No. PCT/US2006/035660, mailed May 22, 2007.

International Preliminary Report on Patentability for International (PCT) Application No. PCT/US2006/035660, issued Apr. 8, 2008.

Supplementary European Search Report for European Patent Application No. 06803508.8, dated Jun. 25, 2010.

Official Action for European Patent Application No. 06803508.8, dated Sep. 28, 2011.

Official Action (translation only) for Taiwan Patent Application No. 095134310, date Nov. 4, 2008.

Official Action (including translation) for Taiwan Patent Application No. 095134310, dated Jun. 25, 2009.

Official Action for U.S. Appl. No. 11/242,646, mailed Jan. 30, 2008.

Notice of Allowance for U.S. Appl. No. 11/242,646, mailed Aug. 21, 2008.

Official Action for U.S. Appl. No. 12/317,295, mailed Jul. 17, 2009.

Official Action for U.S. Appl. No. 12/317,295, mailed Feb. 22, 2010.

Notice of Allowance for U.S. Appl. No. 12/317,295, mailed Sep. 9, 2010.

* cited by examiner

MICRO CAMERA MODULE WITH DISCRETE MANUAL FOCAL POSITIONS

RELATED APPLICATIONS

This application is a continuation of U.S. patent application Ser. No. 12/317,295 filed Dec. 22, 2008 by the same inventors, now U.S. Pat. No. 7,873,269, which is a continuation of U.S. patent application Ser. No. 11/242,646 filed Oct. 3, 2005 by the same inventors, now U.S. Pat. No. 7,469,100, both of which are incorporated herein by reference in their entireties.

BACKGROUND OF THE INVENTION

1. Field of the Invention

This invention relates generally to cameras, and more particularly to very small electronic camera modules. Even more particularly, the invention relates to a device and method for manually adjusting the focal field in small electronic camera modules.

2. Description of the Background Art

Cameras in general, and digital camera modules in particular are well known. Digital cameras commonly incorporate means for adjusting the focal field in order to allow a user to take sharp photos of close up objects, such as business cards or bar codes, as well as distant objects, such as landscapes or people.

In some cameras, the focal field is continuously adjustable over a predefined range. For example, the lens is mounted to a guide so that it can be displaced along the optical axis by an electrical or mechanical drive.

While continuously adjustable lens mechanisms facilitate precise focus at virtually any focal distance in the range, their complexity introduces a variety of disadvantages. One disadvantage is that electrical drive units require power, which shortens battery life. Another disadvantage is the increased number of parts and required assembly time, both of which contribute to the overall cost of the camera. The complexity also increases possible sources of failure and, therefore, results in a decreased reliability for the camera. Yet another disadvantage is that the complexity of the device increases the overall size of the camera.

In mid to lower quality cameras, many of these disadvantages can be at least partially alleviated by replacing the continuously adjustable lens mechanism with a lens mechanism that can be manually transitioned between a plurality of discrete focal positions. Because the lens is moved manually by the user between the various focal positions, the drive motor, linkages, etc. are unnecessary. Further, providing a plurality of discrete focal positions is beneficial, because it eliminates the need to focus the lens for each picture. Thus, a user can take average quality images with minimal effort and experience. Indeed, many digital images that are taken are relatively disposable and do not require a high quality image. For example, taking a picture of a phone number or an address on a business card does not require a very high quality photo, as long as the letters and/or numbers are legible.

Despite the advantages provided by the multiple discrete position, manually operated focus mechanism, this type of mechanism has not been successfully implemented in miniature camera modules, such as camera modules now incorporated into cellular telephones, hand-held personal digital assistants (PDAs), and the like. Problems arise due to the extremely small size; of such camera modules. For example, the components of miniature camera modules are many times smaller than a user's finger and are, therefore, difficult to manipulate. Further, the small components are fragile, and can be easily broken when being directly manipulated by a user. Further, the camera modules should be able to be mounted directly on a circuit board of the main device (cell phone, PDA, etc.), therefore access to the module is somewhat limited. Yet another problem is that it would be difficult to see what position the small lens is in at any given time. Yet another problem is that the camera modules must compete with the host device for allocated space, so focus mechanisms that require extra space would be considered a disadvantage. For any one or more of these reasons, or other reasons, known miniature camera modules do not include user adjustable focus mechanisms, or at least do not include such modules that do not suffer from one or more of the above described disadvantages.

What is needed, therefore, is a miniature camera module, with a user adjustable focus mechanism, that is more compact. What is also needed is a miniature camera module, with a user adjustable focus mechanism, that requires fewer components to function. What is also needed is a miniature camera module, with a user adjustable focus mechanism, that minimizes points of possible failure. What is also needed is a miniature camera module, with a user adjustable focus mechanism, that requires a shorter assembly time and is less expensive to manufacture. What is also needed is a miniature camera module, with a user adjustable focus mechanism that is easy for a user to manipulate manually. What is also needed is a miniature camera module, with a user adjustable focus mechanism, that provides clear indicia of the current focal position of the lens.

SUMMARY

The present invention overcomes the problems associated with the prior art by providing a camera module that can be manually switched between a plurality of discrete focal positions. The camera module is very compact, yet facilitates user adjustment of the focal distance.

The camera module includes a housing, a lens assembly, and a carrier. The carrier includes a first focusing feature for adjustably engaging the lens assembly and a second focusing feature for adjustably engaging the housing. In the particular embodiment shown, the carrier is a sleeve formed from a substantially cylindrical shell that includes an inner wall, an outer wall, a top surface, and a lower surface. The inner portion of the sleeve includes a portion of the first focusing feature (e.g., threads, ramps, channels, etc.), and the outer wall of the sleeve defines the second focusing feature. In the specific example shown, the second focusing feature is a sloped channel that is engaged by a pin fixed to the housing. The channel extends from the lower portion of the sleeve to and through the upper surface of the sleeve such that the channel does not include an upper boundary. The channel defines the rotational limits of the sleeve and includes at least two detents that define different focal positions. In the particular embodiment described, the detents are spaced apart depressions formed in the channel that each provide a discrete, stable resting position for an associated engaging pin. The channel includes an intermediate portion that is relatively higher than the depressions, so that the pin is urged toward on of the depressions or the other.

The example housing shown includes a substantially rectangular base with side walls extending upwardly therefrom. A portion of the side walls form legs extending upwardly from the corners of the base. Two of four legs include apertures through which retaining pins pass to engage the channel of the sleeve. The two legs that receive pins are positioned near opposite corners of the base. The inner portions of the legs are rounded to match the contour of the cylindrical sleeve. Forming legs near the corners of the base contributes to a reduction in the size of the camera module such that the width of the housing base can be as small as the outer diameter of the sleeve.

In the example embodiment shown, a biasing member is disposed between the sleeve and the housing. The biasing member is a resilient, tapered ring. The bottom portion of the sleeve is tapered so as to have a similar contour to the inner portion of the biasing member. Optionally, the biasing member is an o-ring and the bottom of the sleeve defines a seat for the o-ring.

The housing is mounted to a substrate over an image capture device also mounted on the substrate. The example housing shown is mounted via a plurality of posts extending from the bottom of the base of the housing. The posts are fixed within apertures formed in the substrate for that purpose. An optional switch (mechanical, optical, magnetic, etc.) is also mounted to the substrate. The switch engages a portion of the sleeve and generates a signal indicative of the sleeve's rotational position. A portion of the housing surrounds the switch to protect it from accidental impact.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a micro camera module with a plurality of discrete manual focal positions. In the following description, numerous specific details are set forth (e.g., particular lens assemblies, particular construction materials, etc.,) in order to provide a thorough understanding of the invention. Those skilled in the art will recognize, however, that the invention may be practiced apart from these specific details. In other instances, details of well known electronic manufacturing and assembly practices and components have been omitted, so as not to unnecessarily obscure the present invention.

Figure 1:
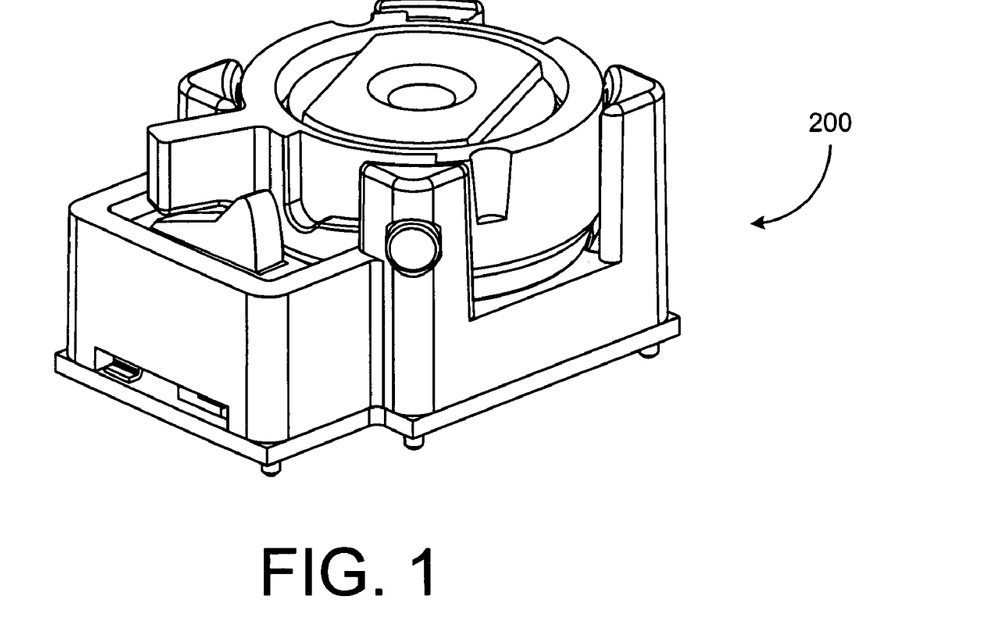
FIG. 1 is a perspective view of a camera module in a first discrete focal position.
Figure 2:
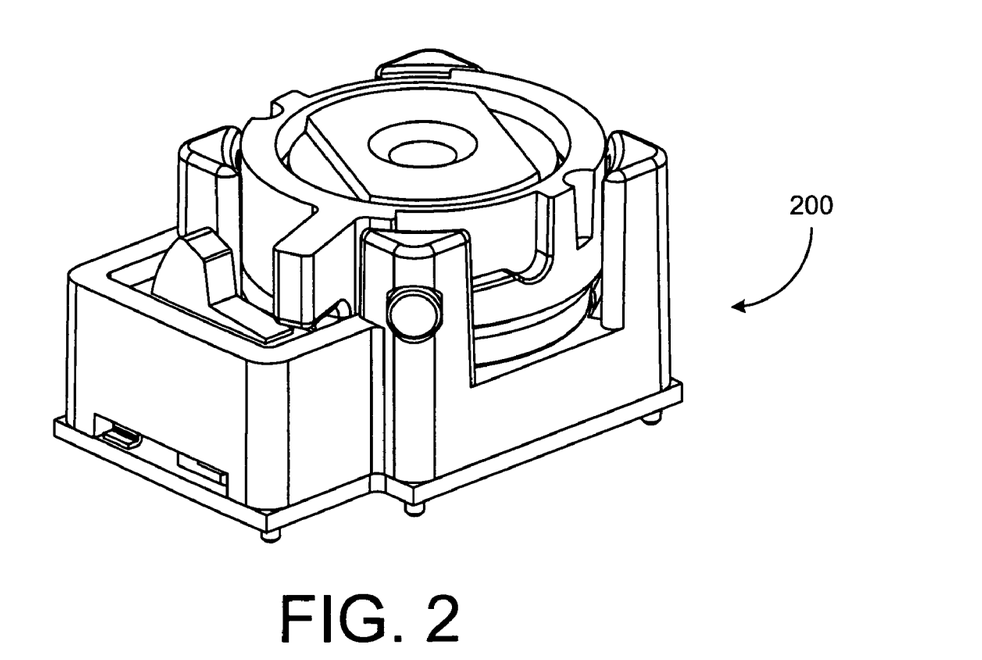
FIG. 2 is a perspective view of the camera module of FIG. 1 in second discrete focal position.

FIGS. 1 and 2 show an assembled camera module 200 in first and second discrete focal positions, respectively. In this particular embodiment, camera module 200 includes a close focal position and an infinite focal position. In the first focal position, camera module 200 focuses on images that are roughly within a few inches to a foot or so of camera module 200. This is necessary when taking photos of relatively small objects (e.g., business cards, bar codes, etc.) or a user taking a photo of their own face at arms length. In the infinite focal position camera module 200 focuses on objects that are farther from camera module 200. For example, images of a landscape or of a subject several yards away would be in focus at the infinite position. It should be noted that although the example embodiment is shown with only two discrete focal positions, the invention is not so limited. Indeed, alternate embodiments of the invention can include three or more discrete focal positions.

Figure 7:
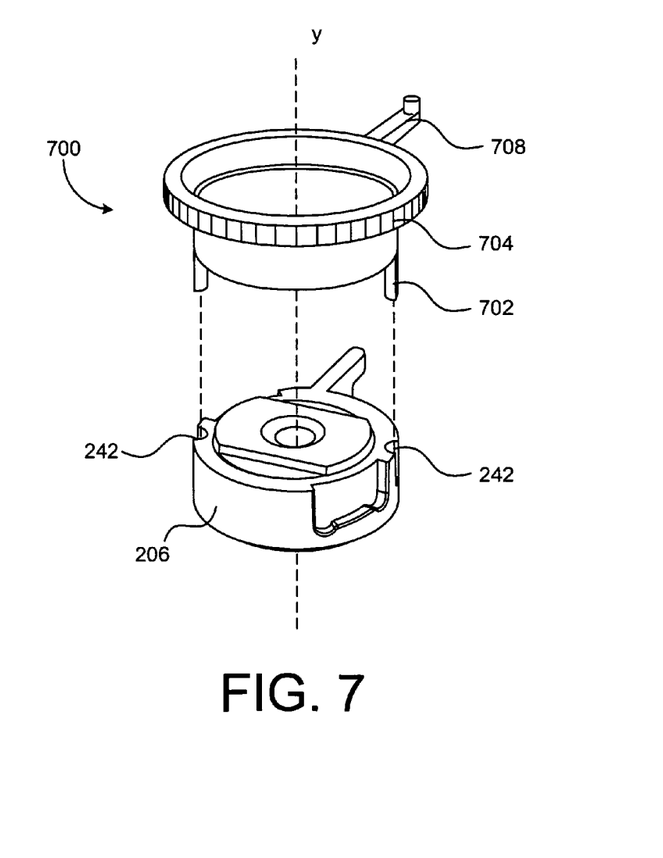
FIG. 7 is a partially exploded view of a manual adjustment device for engaging the sleeve of FIG. 4.

Camera module 200 is switched between the first and second focal positions manually. Therefore, camera module 200 does not require any automated drive means, thus, making it even more compact than modules with alternative drive means. Camera module 200 can be moved between the first and second focal positions either directly by a users finger or via a simple adjustment device 700 (FIG. 7).

Although camera module 200 can be incorporated into a consumer camera product, it is expected that camera module 200 will be more commonly incorporated into consumer electronic devices having alternate primary functions. For example, camera module will provide a significant advantage over the prior art in devices including, but not limited to, mobile telephones, personal digital assistants, audio players, and other multimedia and/or communications devices. In such devices, camera module 200 competes for space with the primary components of the host device. Therefore, the compact size of camera module 200 in combination with the ability to adjust focus is very advantageous.

Figure 3:
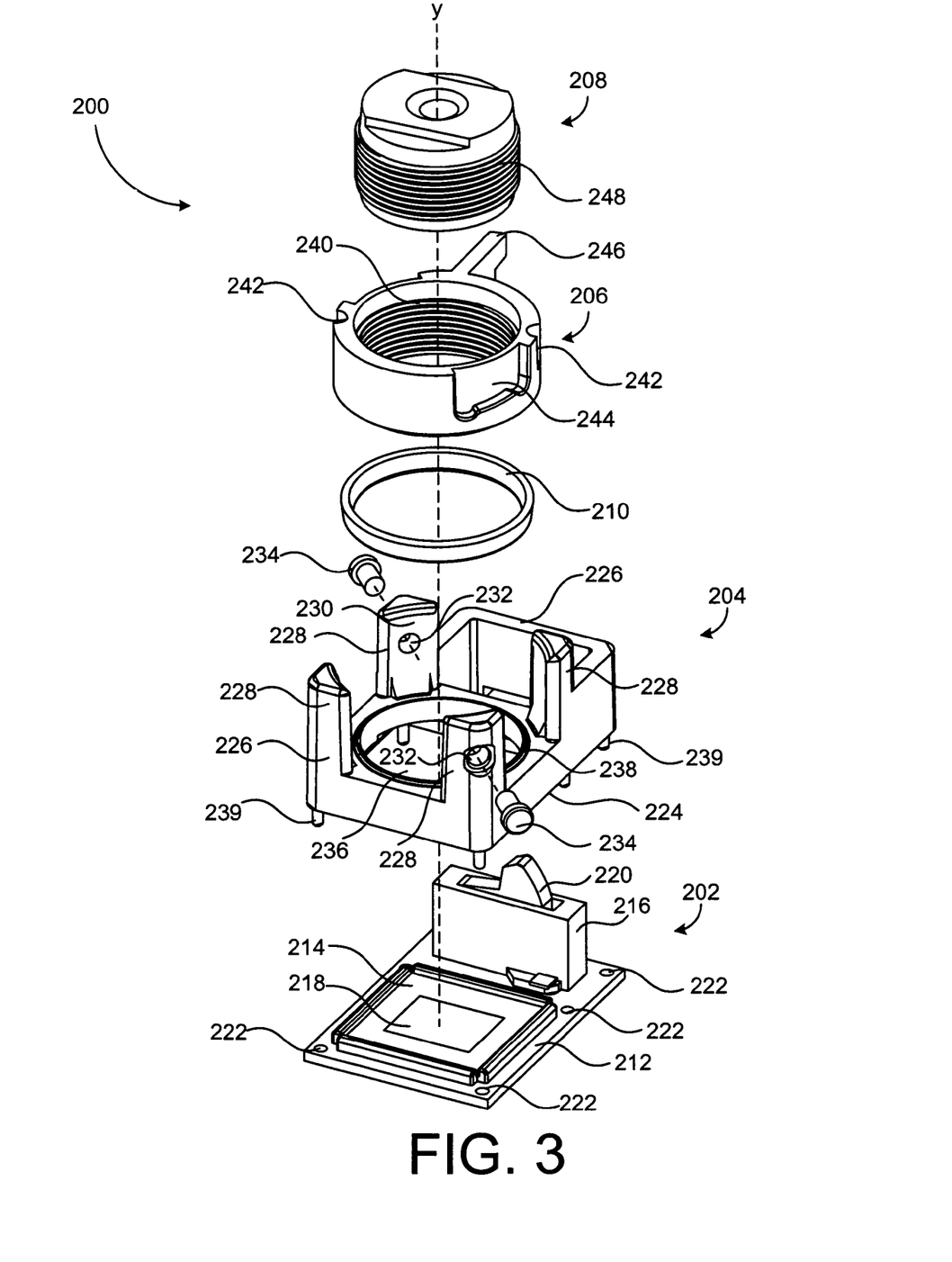
FIG. 3 is an exploded view of the camera module of FIG. 1.

FIG. 3 is an exploded view showing camera module 200 to include camera electronics 202, a housing 204, a sleeve 206, and a lens assembly 208. Camera module 200 further includes a biasing member 210 disposed between sleeve 206 and housing 204.

Camera electronics 202 includes a substrate 212 with an image capture device 214 and a focal position indicator switch 216 mounted thereon. Image capture device 214 includes a sensor array 218 formed on an integrated circuit chip and disposed substantially perpendicular to an optical axis (y). Indicator switch 216 includes a mechanical rocker 220 that is actuated by a portion of sleeve 206, as will be described in greater detail below. Depending on the position of rocker 220, indicator switch 216 provides an electrical signal indicative of one of the two focal modes (close and infinite). The electrical signal is used to provide a user with an indication of the current focal position via a user display device (e.g., LCD, indicator light, etc.). It should be understood that substrate 212 can have additional circuitry mounted thereon, but such circuitry is not particularly germane to the present invention and, therefore, is not shown. Substrate 212 also defines a plurality of apertures 222 (only 4 of 6 visible in FIG. 3) that facilitate the mounting of housing 204 to substrate 212.

Housing 204 provides structural support and a means for mounting and aligning the other elements of camera module 200. In this particular embodiment, housing 204 includes a substantially rectangular base 224 with walls 226 extending upwardly therefrom. At one end of housing 204 walls 226 partially surround indicator switch 246 so as to provide protection against accidental impact. At the other end of housing 204 walls 226 form four sleeve support legs 228 that have rounded inner surfaces 230 contoured to the outer surface of sleeve 206 such that sleeve 208 is constrained to rotate about the optical axis (y). Two of the four support legs 228 include apertures 232 that receive and support pins 234, which slidably engage sleeve 206 to retain sleeve 206 in housing 204 while allowing limited rotation of sleeve 206.

Providing support legs 228 at the corners of housing 204 provides a size advantage. In particular, because side walls 226 need not extend completely around sleeve 206, the width of housing 204 need not exceed the diameter of sleeve 206.

Housing base 224 defines an aperture 236 through which lens assembly 208 focuses images on image capture device 214. A channel 238 around aperture 236 provides a seat for biasing member 210, which in this particular embodiment is a resilient ring.

Housing 204 also includes a plurality of posts 239 that each engage a respective one of apertures 222 through substrate 212. Posts 239 and apertures 222 are positioned to properly align the center of sensor array 218 with optical axis (y). Once posts 239 are positioned through apertures 222, they are fixed to substrate 212 via adhesive, thermal welds, fasteners, or any other suitable means.

Sleeve 206 functions as a carrier for lens assembly 208 and provides two separate focusing features. In this particular embodiment, sleeve 206 is shaped substantially as a cylindrical shell and includes an inner thread set 240, a plurality of manipulation channels 242, two focus adjustment channels 244, and a switch engaging portion 246.

Thread set 240 functions as the first focusing feature. Thread set 240 is formed on the inner wall of sleeve 206 to accept a complementary thread set 248 of lens assembly 208. The mated thread sets 240, 248 provide a means for fine vertical adjustment between sleeve 208 and lens assembly 202 to facilitate factory focus of lens assembly 208 with respect to image capture device 214. As lens assembly 208 is rotated within sleeve 206, lens assembly moves along optical axis (y). Once lens assembly 208 is properly positioned within sleeve 206 (focused), lens assembly 208 is fixed in position with respect to sleeve 206 with, for example, an adhesive or a thermal weld.

Channels 244 in combination with pins 234 provide the second (user adjustable) focus feature. Biasing member 210 exerts an upward force on sleeve 206 when sleeve 206 is positioned within housing 204. This upward force biases the lower portion of focus adjustment channels 244 against pins 234, thereby maintaining sleeve 206 in the proper vertical position with respect to image capture device 218. Further, channels 244 defines the range through which sleeve 206 can rotate. The structure and function of channels 244 is explained in greater detail with reference to FIGS. 4-5 below.

It should be noted that the invention is not limited to the particular structures used to provide the first and second focusing features. For example, complementary thread sets 240 and 248 can be replaced with other adjustment structures including, but not limited to, complementary ramps and pin/groove structures. Similarly, alternate means for defining a plurality of discrete focus positions including, but not limited to, stepped ramps and saw tooth structures can be substituted for the example of the second focus feature described.

Manipulation channels 242 provide means for engaging and rotating sleeve 206 within housing 204 after camera module 200 is assembled, as will be discussed in greater detail below with reference to FIG. 7. As sleeve 206 is rotated, switch engaging potion 246 moves rocker 220 of indicator switch 216 back and forth between the two previously described switch position. It should be understood that alternate switches/indicators can be substituted for switch 216. For example, in embodiments where the second focus feature includes three or more discrete focus positions, a multipole switch, a slider switch, or any other means for determining the position of sleeve 206 can be substituted for switch 216.

Figure 4:
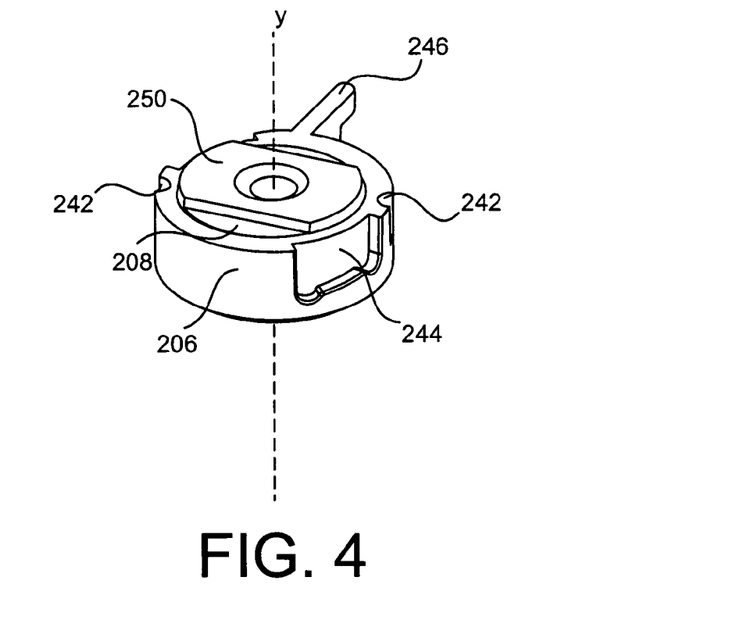
FIG. 4 is a perspective view of a lens assembly of FIG. 2 within a sleeve of FIG. 2.

FIG. 4 is a perspective view of lens assembly 208 disposed within sleeve 206. Those skilled in the art will recognize that lens assembly 208 will include one or more lenses and other components (e.g., infrared filters, etc.), which are required to focus a clear optical image on image capture device 236. The particular optical components of lens assembly 208 will vary according to application, and are not particularly relevant to the present invention. As described above, lens assembly 208 includes a set of threads 248 (shown in FIG. 3), that mate with a complementary set of threads 240 inside sleeve 206, such that lens assembly 208 can be screwed into and out of sleeve 206. Rotating lens assembly 208 within sleeve 206 will cause lens assembly 208 to move up or down (along the optical axis (y)) within sleeve 206, depending on the direction of rotation, thereby facilitating the factory focusing of module 200. Lens assembly 208 defines a raised portion 250 that enables lens assembly 208 to be engaged and rotated into focus by automated equipment during assembly. Note that the factory focus procedure is performed after lens assembly 208 and sleeve 206 are seated in housing 204. In this particular embodiment, lens assembly 202 is designed to be threaded almost entirely into sleeve 206, thereby decreasing the overall height of camera module 200. Note that after lens assembly 208 is factory focused within sleeve 206, it is fixed in position within sleeve 208 by some suitable means (e.g., adhesive, thermal weld, etc.).

Figure 5:
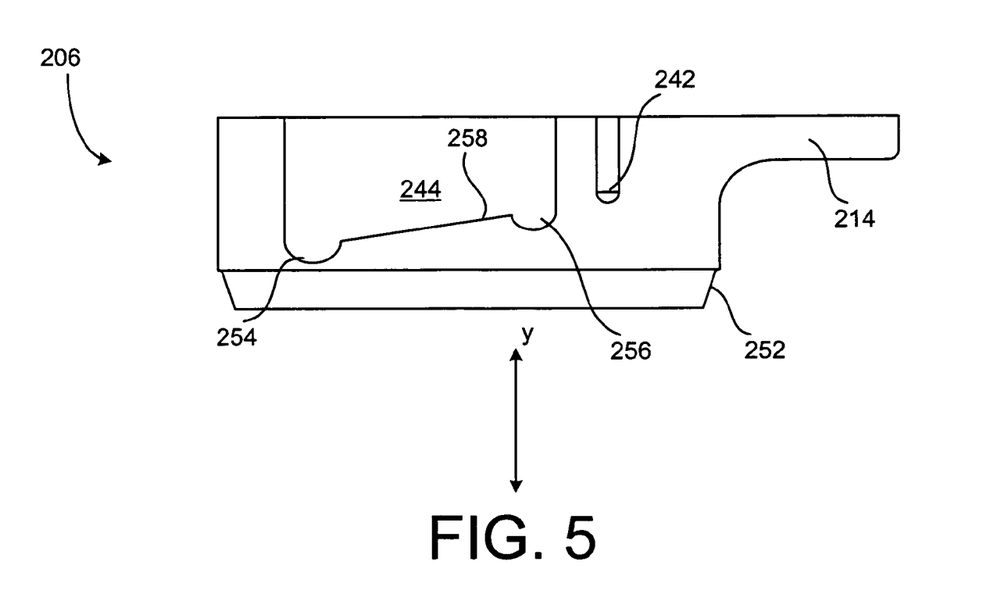
FIG. 5 is a side view of the sleeve of FIG. 4.

FIG. 5 is a side elevational view of sleeve 206 showing a tapered lower portion 252 that engages biasing member 210, which maintains an upward force on sleeve 206, as will be explained in greater detail with reference to FIG. 6 below. The upward force urges the lower surface of channel 244 against pins 234 (FIG. 3).

Channel 244 is sloped such that upon rotation, sleeve 206 will move up or down in the y direction, depending on the direction that sleeve 108 is turned (a typical range is approximately 0.15 mm to 0.3 mm., depending on the particular design of lens assembly 208). The change in y direction changes the distance between lens assembly 208 and image capture device 236, thereby changing the focal field.

Note that channel 244 defines two discrete, stable focal positions. In particular, channel 244 includes a lower detent 254 and an upper detent 256, corresponding to the close and infinite focal positions, respectively. In this particular embodiment detents 254 and 256 include spaced apart portions 254, 256 of channel 244 separated by an intermediate portion 258 that is relatively higher than the spaced apart portions 254, 256. The force exerted by biasing member 210 allows smooth rotation of sleeve 206, yet is sufficient to secure sleeve 206 into either of the stable focal position when pins 224 pass over the apex of intermediate portion 258. Further, detents 254 and 256 define relatively sharp drops in channel 244 so as to provide a "click", which indicates to the user that sleeve 206 is secured into a stable focal position.

The degree in which sleeve 206 can rotate depends on the length of channel 230. In this particular embodiment, sleeve 206 can rotate approximately forty degrees about the y-axis. This is sufficient to change the distance between image capturing device 236 and lens assembly 202 from approximately 0.15 mm to 0.30 mm. It should be understood, however, that more or less displacement along the optical axis (y) can be provided with a greater or lesser angle of rotation, depending on the slope of channel 244. Additionally, channel 244 can include more than two detents, in order to provide three or more discrete, stable focal positions. Finally, although this particular embodiment of the invention employs two of channels 244, it should be understood that alternate embodiments can include 1, 3, 4, or more of channels 244.

Traditionally, cam-type channels are enclosed by all sides. For example, in U.S. Pat. No. 6,426,839 B2, issued to Dou et al, a particular embodiment discloses a channel that defines an upper surface, a lower surface, and two end surfaces. Channel 244 includes a lower surface and two side surfaces, and no upper surface. Because channel 244 does not include an upper surface, it can be manufactured and assembled more efficiently. For example, it is easier to remove sleeve 206 from a mold, because channel 244 includes an open top. In particular, channel 244 extends from a lower portion of sleeve 206 to and through the upper surface of sleeve 206.

Figure 6:
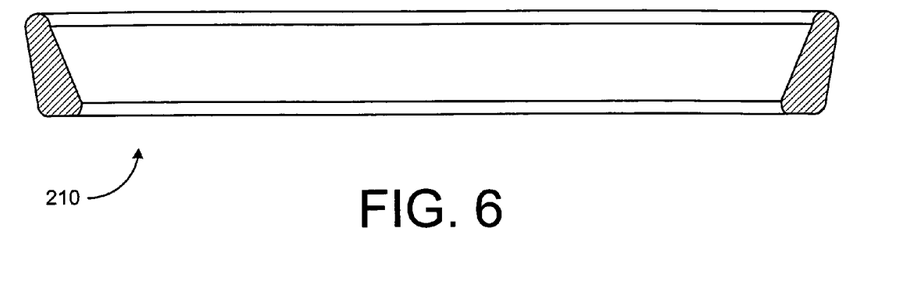
FIG. 6 is a cross-sectional view of a biasing member of FIG. 3.

FIG. 6 shows a cross-sectional view of biasing member 210. In this particular embodiment, biasing member 210 is a tapered ring, with an upper inside diameter that is greater than its lower inside diameter. Biasing member 210 is composed of acetal copolymer, which is a semi-flexible material that allows biasing member 210 to be stretched outwardly without surpassing it's elastic limit. The lower tapered portion 252 (FIG. 5) of sleeve 206 is contoured similar to the inner surface of biasing member 210. Therefore, when sleeve 206 is rotated such that tapered portion 252 is pushed down into biasing member 210, biasing member 210 is stretched outward rather than compressed. When stretched by tapered portion 252 of sleeve 206, biasing member 210 exerts an inward restoring force. The inward restoring force exerted between the inclined surfaces of biasing member 210 and tapered portion 252 of sleeve 206 causes an upward force on sleeve 206, which keeps the bottom surfaces of channels 244 pressed against pins 234.

FIG. 7 shows a perspective view of an annular, manual adjustment device 700 aligned to engage manipulation channels 242 of sleeve 206. In this particular embodiment, manual adjustment device 700 includes two downwardly extending engagement arms 702 that fit firmly into corresponding channels 242 of sleeve 206. Manual adjustment device 700 further includes an outer portion 704 that has a plurality small grooves that facilitate frictional engagement by a user's finger. Optionally, manual adjustment device 700 includes a lever 706 that also facilitates rotation of adjustment device 700 about the optical axis (y).

Adjustment device 700 engages sleeve 206 through an opening in a housing (not shown) of an electronic device (not shown) in which camera module 200 is mounted. In addition to providing a means for rotating sleeve 206, adjustment device 700 masks the opening in the housing of the electronic device, thereby relaxing the required tolerances between camera module 200 and the electronic device. Note that the particular shape and size of adjustment device 700 is not critical, as long as adjustment device 700 provides a means for manually rotating sleeve 206.

Figure 8A:
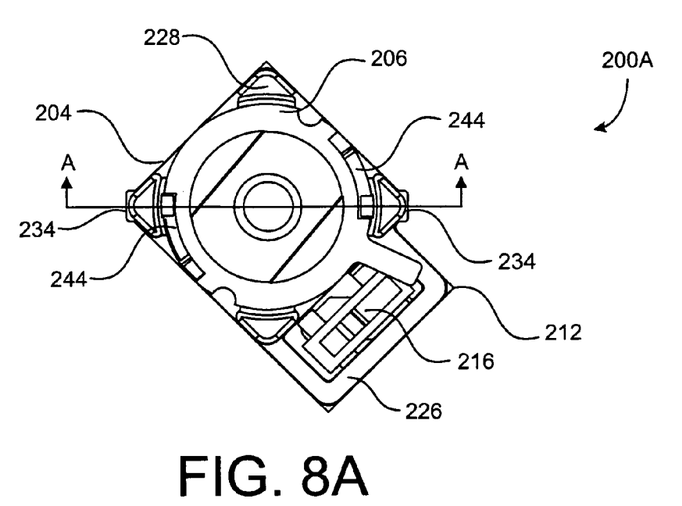
FIG. 8A is a top plan view of the camera module of FIG. 2.

FIG. 8A is a top plan view of assembled camera module 200. Note that none of the components of camera module 200 extend beyond it's footprint, which has substantially the same area dimensions as substrate 212. Note also that the diameter of sleeve 206 (which is approximately 10.0 mm) is the same as the width of substrate 212 and the footprint of housing 204. Further, lever 246 does not extend beyond wall 226. Indeed, in an alternate embodiment, switch 216 and lever 246 are omitted, and neither the length nor the width of the alternate camera module exceeds the diameter of sleeve 206. The combination of design features that contribute to the reduced dimensions of camera module 200 is considered to provide an important advantage.

Figure 9A:
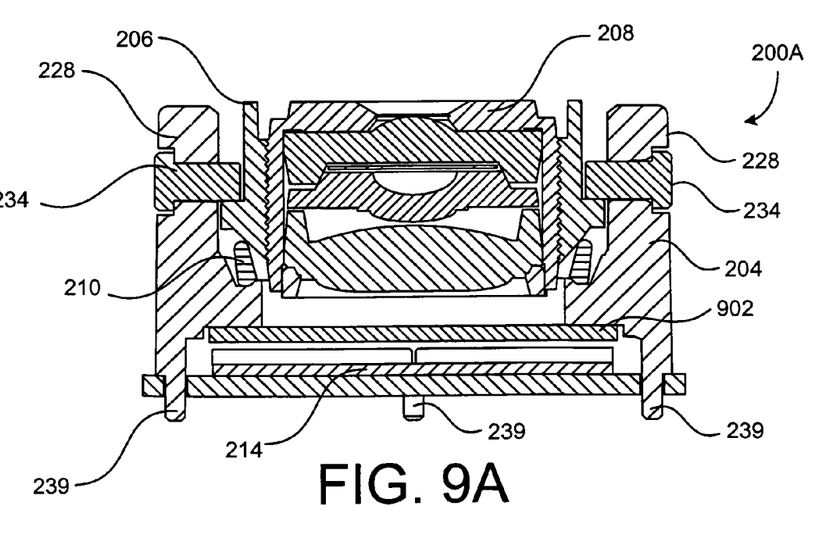
FIG. 9A is a cross-sectional view of the camera module of FIG. 8A taken along line A-A of FIG. 8A.

FIG. 9A is a cross-sectional view of camera module 200 taken along line A-A of FIG. 8A. Most of the components, shown in FIG. 9A have been previously shown and described with reference to other figures of the drawings. However, the view of FIG. 9A provides additional clarification with respect to the interrelationship of the various components of assembled camera module 200. Additionally, FIG. 9A shows a transparent protective cover 902 that protects image capture device 214 from particulate matter that may be generated during the mounting and focusing of lens assembly 208 and/or sleeve 206.

Figure 8B:
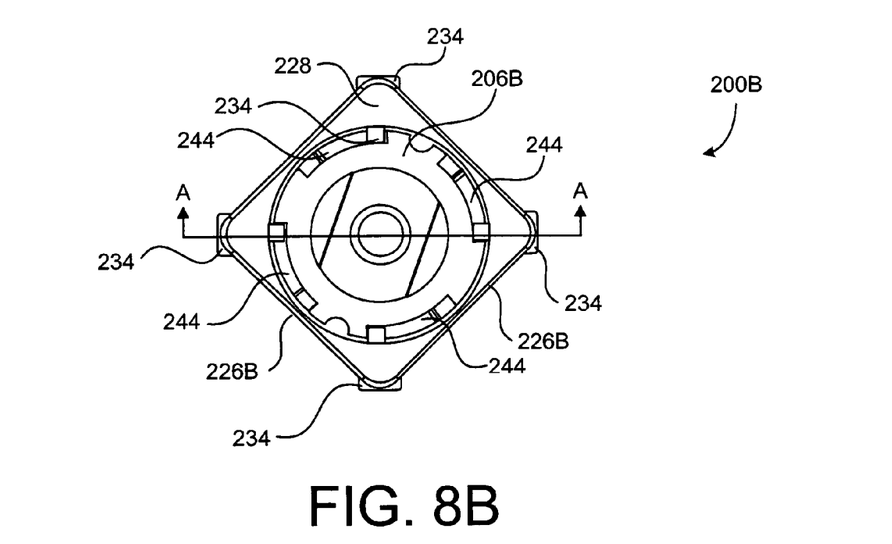
FIG. 8B is a top plan view of an alternate camera module.
Figure 9B:
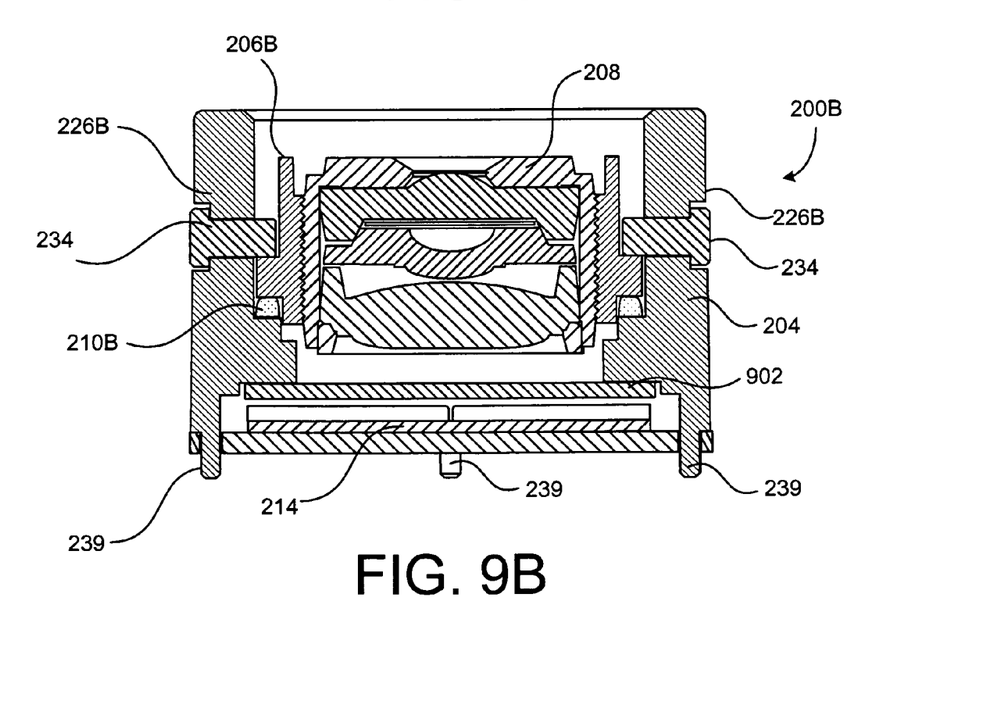
FIG. 9B is a cross-sectional view of the camera module of FIG. 8B taken along line A-A of FIG. 8.

FIG. 8B and FIG. 9B show an alternate camera module 200B. Most of the components of camera module 200B are similar to corresponding components of camera module 200. However, there are some structural and functional differences.

One difference between camera module 200A and camera module 200B is that switch 216 is omitted. As a result, the over all size of camera module 200B is significantly reduced. Note that both the length and width of camera module 200B are only slightly larger than the outer diameter of sleeve 206.

Another difference between camera modules 200A and 200B is that wall 226B extends completely around sleeve 206B instead of forming legs 228 (FIG. 8A). The continuous nature of wall 226B provides additional structural support, but slightly increases the overall dimensions of camera module 200B. In particular, note that the width of camera module 8A is the same as the diameter of sleeve 206, whereas the width of camera module 200B is slightly larger than the diameter of sleeve 206B.

Walls 226B also extend higher than sleeve 206B and lens assembly 208, even when sleeve 206B and lens assembly 208 are in their highest focal position. This feature provides an advantage in that walls 226B prevent other structures from exerting undesirable forces on lens assembly 208 and/or sleeve 206B. For example, if a protective cover or the housing of a host device (neither shown) are positioned above camera module 200B, such structures are physically isolated from lens assembly 208 and sleeve 206B by walls 226B. Therefore, such structures are prevented from tilting or otherwise adversely affecting the focal position of lens assembly 208.

Yet another difference is that alternate camera module 200B is that alternate sleeve 206B includes four channels 244 which are each engaged by a respective one of four pins 234. In the embodiment shown, each of channels 244 is substantially identical. However, it should be understood that it is not necessary for all four of channels 244 to include a detent. For example, detents can be provided in two of channels 244 on opposite sides of sleeve 206B. The remaining two channels can simply include inclined surfaces with no detents.

Yet even another difference is that module 200B includes an alternate biasing member 210B. Biasing member 210B is a compressible rubber ring that exerts an upward force on the bottom of sleeve 206B, which is adapted to abut biasing member 210B. As shown in FIG. 9B, biasing member 210B is an o-ring of substantially circular cross-section. However, alternate biasing members (e.g., die cut foam ring, rectangular cross-section, etc.) can be used.

Finally, it should be understood that the alternate features shown in module 200B are not necessarily dependent on one another. For example, module 200A could be modified to include four pins 234 without omitting switch 216. As another example, wall 226B of module 200B could be modified to define legs at the corners of the module (similar to module 200A) instead of extending completely around sleeve 206B, thereby allowing a reduction in size. As yet another example, legs 228 of module 200A can be extended upwardly to prevent external structures from contacting sleeve 206 or lens assembly 208. As these examples show, some of the alternate features of camera module 200B can be used independent of other features.

Various methods of the present invention will now be described with reference to FIGS. 10-13. For the sake of clear explanation, these methods are described with reference to the previously described structures. However, it should be noted that alternate structures, whether explicitly described herein or created in view of the present disclosure, could be substituted for those cited without departing from the scope of the present invention. Therefore, it should be understood that the methods of the present invention are not limited to any particular structures(s), unless explicitly recited in the claims. Further, some steps of the methods presented need not necessarily occur in the order shown. For example, in some cases two or more method steps may occur simultaneously. These and other variations of the methods disclosed herein will be readily apparent, especially in view of the description of the present invention provided previously herein, and are considered to be within the full scope of the invention.

Figure 10:
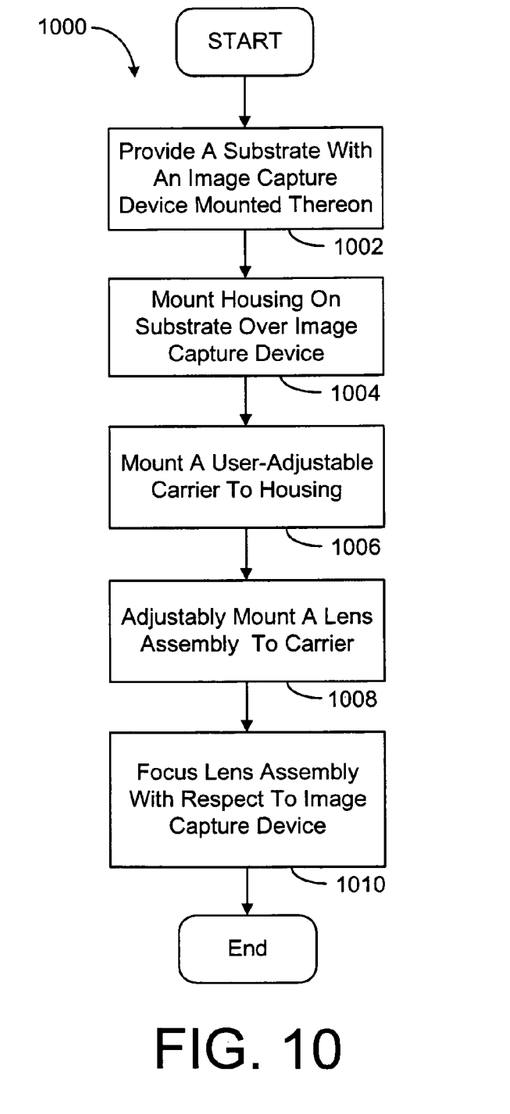
FIG. 10 is a flow chart summarizing a method for assembling a camera module according to one aspect of the present invention.

FIG. 10 is a flow chart summarizing one method 1000 for assembling camera module 200 according to one aspect of the present invention. In a first step 1002, substrate 212 with image capture device 214 mounted thereon is provided. Next, in a second step 1004, housing 204 is mounted on substrate 212, over image capture device 214. Then, in a third step 1006, sleeve 206 is adjustably mounted to housing 210. Next, in a fourth step 1008, lens assembly 208 is adjustably mounted in sleeve 206. Finally, in a fifth step 1010, lens assembly 208 is focused with respect to image capture device 214.

Figure 11:
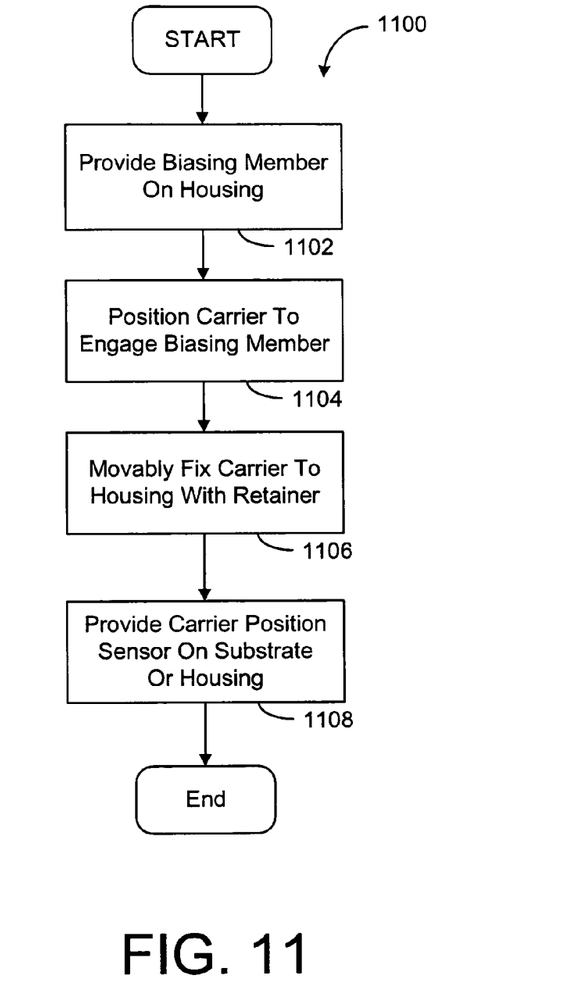
FIG. 11 is a flow chart summarizing a method for mounting a carrier within a housing.

FIG. 11 is a flow chart summarizing one particular method 1100 for method of performing third step 1006 (mount user adjustable carrier to housing) of method 1000. In a first step 1102, biasing member 210 is provided on housing 204. Next, in a second step 1104, sleeve 206 is positioned to engage biasing member 210. Then, in a third step 1106, sleeve 206 is movably retained in housing 204 with retaining pins 234. Then, in a fourth step 1108, sleeve 206 is positioned to engage switch 246, which serves as a position sensor for sleeve 206.

Figure 12:
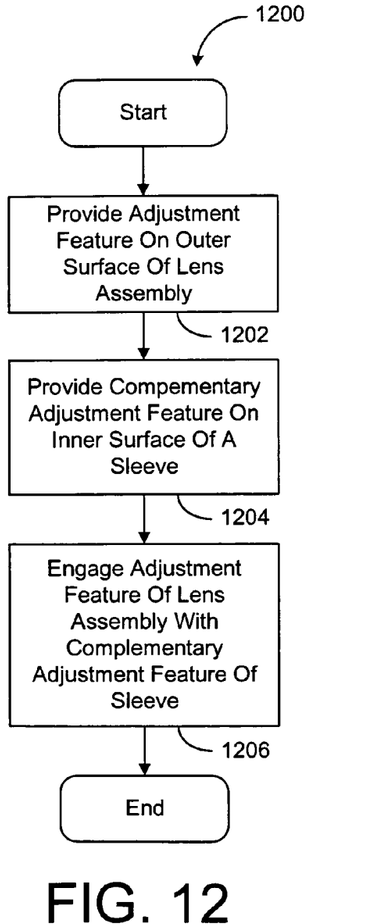
FIG. 12 is a flow chart summarizing a method for adjustably mounting a lens assembly to a carrier.

FIG. 12 is a flow chart summarizing one particular method 1200 for performing fourth step 1008 (adjustably mount lens assembly to carrier) of method 1000. In a first step 1202, an adjustment feature (e.g., thread set 248) is provided on the outer surface of lens assembly 208. Next, in a second step 1204, a complementary adjustment feature (e.g., thread set 240) is provided on the inner surface of sleeve 208. Finally, in a third step 1206, the adjustment feature of lens assembly 208 is engaged with the complementary adjustment feature of sleeve 206 to adjustably mount lens assembly 208 to sleeve 206.

Figure 13:
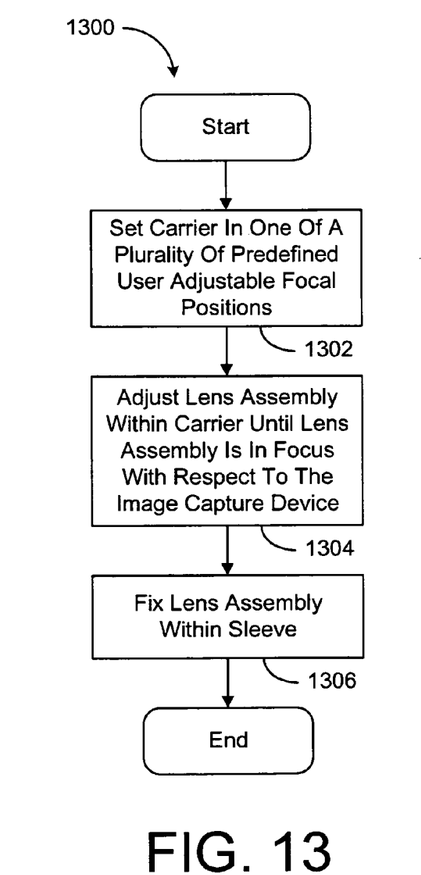
FIG. 13 is a flow chart summarizing a method for focusing a lens assembly.

FIG. 13 is a flow chart summarizing one particular method 1300 for performing fifth step 1010 (focus lens assembly with respect to image capturing device) of method 1000. In a first step 1302, sleeve 206 is rotated into one of the predefined user adjustable focal positions. Next, in a second step 1304, lens assembly 208 is rotated until it is in focus with respect to image capture device 214. Finally, in a third step 1306, lens assembly 208 is permanently fixed in position within sleeve 206.

The description of particular embodiments of the present invention is now complete. Many of the described features may be substituted, altered or omitted without departing from the scope of the invention. For example, alternate adjustment features may be substituted for the example adjustment mechanisms provided. As another example, alternate biasing members may be substituted for tapered ring 210 including, but not limited to, resilient o-rings, die cut foam, and so on. These and other deviations from the particular embodiments shown will be apparent to those skilled in the art, particularly in view of the foregoing disclosure.

We claim:

1. A camera module comprising:
a housing;
a lens assembly; and
a cylindrical sleeve rotatably disposed within said housing, said cylindrical sleeve including a first focusing feature for adjustably engaging said lens assembly and a second focusing feature for adjustably engaging said housing; and
wherein a width of said housing does not exceed an outer diameter of said cylindrical sleeve.

2. A camera module according to claim 1, wherein said cylindrical sleeve includes an inner wall, an outer wall, a top surface, and a bottom surface.

3. A camera module according to claim 2, wherein a portion of said first focus feature is formed on said inner wall of said sleeve.

4. A camera module according to claim 3, wherein said first focus feature includes a set of threads.

5. A camera module according to claim 3, wherein said first focus feature includes at least one inclined surface.

6. A camera module according to claim 3, wherein said first focus feature includes a channel for engaging a protrusion.

7. A camera module according to claim 2, wherein said outer wall of said sleeve includes a portion of said second focus feature.

8. A camera module according to claim 7, wherein said second focus feature includes at least one channel adapted to receive at least one pin.

9. A camera module according to claim 8, wherein said channel is formed in said sleeve and intersects said top surface or said bottom surface of said sleeve.

10. A camera module according to claim 8, wherein said channel defines the rotational limits of said sleeve.

11. A camera module according to claim 8, wherein said channel defines at least two detents, each disposed to define a particular focal length.

12. A camera module according to claim 11, wherein said detents are spaced apart portions of said channel separated by another portion of said channel that is relatively higher or relatively lower than said spaced apart portions of said channel.

13. A camera module according to claim 11, wherein at least one of said detents provides a tactile indication of engagement or disengagement.

14. A camera module according to claim 11, wherein said channel is formed on said sleeve and said pin is fixed to said housing.

15. A camera module according to claim 11, further comprising a biasing member disposed between said housing and said sleeve to bias a surface of said channel against said pin.

16. A camera module according to claim 15, wherein said biasing member is a resilient ring disposed between said bottom surface of said sleeve and said housing.

17. A camera module according to claim 16, wherein said bottom portion of said sleeve is tapered.

18. A camera module according to claim 2, wherein said housing includes a substantially rectangular base with side walls extending upwardly from said base.

19. A camera module according to claim 18, wherein a portion of said side wall forms at least one leg extending upwardly from at least one corner of said base.

20. A camera module according to claim 19, wherein said at least one leg supports a guide pin of said second focus feature.

21. A camera module according to claim 20, wherein at least one of said legs defines an aperture through which said guide pin is disposed.

22. A camera module according to claim 20, wherein said housing includes a plurality of said legs and a plurality of guide pins.

23. A camera module according to claim 22, wherein each of said legs extends beyond a top surface of said lens assembly.

24. A camera module according to claim 23, wherein each of said legs extends beyond said top surface of said sleeve.

25. A camera module according to claim 22, wherein at least two of said legs are disposed on opposite corners of said housing.

26. A camera module according to claim 19, wherein an inner surface of said leg is contoured to said sleeve.

27. A camera module according to claim 19, wherein an outer diameter of said sleeve is at least as large as the smaller of the length or width of said rectangular base.

28. A camera module according to claim 18, wherein an outer diameter of said sleeve is at least as large as the smaller of the length or width of said rectangular base.

29. A camera module according to claim 18, wherein said housing further includes at least one pin engaging said sleeve with said housing.

30. A camera module according to claim 29, wherein said housing includes a plurality of pins engaging said sleeve with said housing.

31. A camera module according to claim 30, wherein said housing includes exactly two pins.

32. A camera module according to claim 30, wherein said housing includes exactly four pins.

33. A camera module according to claim 30, wherein said pins are positioned at opposite corners of said housing.

34. A camera module according to claim 18, wherein said housing includes a rounded inner portion wherein said sleeve is disposed.

35. A camera module according to claim 18, wherein said base of said housing defines an opening disposed such that light focused by said lens assembly passes through said opening.

36. A camera module according to claim 35, wherein said housing defines a channel around said opening to position a biasing member.

37. A camera module according to claim 18, wherein said side walls extend beyond a top surface of said lens assembly.

38. A camera module according to claim 18, wherein said side walls extend beyond said top surface of said sleeve.

39. A camera module according to claim 1, wherein said camera module includes a biasing member disposed between a portion of said housing and a portion of said carrier.

40. A camera module according to claim 39, wherein said biasing member is an o-ring.

41. A camera module according to claim 39, wherein said biasing member is a resilient ring.

42. A camera module according to claim 41, wherein said resilient ring is a compressible rubber ring.

43. A camera module according to claim 41, wherein said resilient ring is tapered such that a diameter of an upper portion is larger than a diameter of a lower portion.

44. A camera module according to claim 1, comprising:
a substrate affixed to said housing; and
an image capture device fixed to said substrate.

45. A camera module according to claim 1, wherein said camera module further includes a switch operative to generate an electrical signal based on one or more positions of said second focus feature.

46. A camera module according to claim 45, wherein said carrier includes a portion disposed to actuate said switch.

47. A camera module according to claim 46, wherein said portion does not extend beyond the footprint of said housing.

48. A camera module according to claim 45, wherein said housing encloses at least a portion of said switch.

49. A camera module according to claim 1, wherein said lens assembly is fixed in position with respect to said carrier.

50. A camera module according to claim 1, further comprising:
a circuit substrate; and wherein
a width of said circuit substrate does not exceed the outer diameter of said cylindrical sleeve.

51. A camera module according to claim 1, further comprising:
a manual adjustment device engaging said cylindrical sleeve;
whereby said sleeve can be manually rotated from above said cylindrical sleeve.

* * * * *